United States Patent

[11] 3,600,014

[72] Inventor Thomas Harris
  Chesterland, Ohio
[21] Appl. No. 845,178
[22] Filed July 28, 1969
[45] Patented Aug. 17, 1971
[73] Assignee The Glastic Corporation
  South Euclid, Ohio

[54] MECHANICAL END FITTINGS FOR TENSION RODS
  9 Claims, 7 Drawing Figs.
[52] U.S. Cl. .................................................. 287/83
[51] Int. Cl. ............................................... F16g 11/00
[50] Field of Search............................................ 287/124,
  82, 81, 78, 80, 83; 24/126.3, 122.3, 122.6, 126, 136.3

[56] References Cited
UNITED STATES PATENTS

| | | | |
|---|---|---|---|
| 1,384,489 | 7/1921 | Shaffer............................ | 24/126.3 |
| 1,392,480 | 10/1921 | Clarke............................ | 24/126.3 |
| 1,429,371 | 9/1922 | Shaffer............................ | 24/126.3 |
| 1,547,972 | 7/1925 | Spannaus....................... | 287/82 |
| 3,085,305 | 4/1963 | Colombet et al. ............... | 287/81 X |
| 3,129,282 | 4/1964 | Flynn............................. | 287/124 X |
| 3,367,686 | 2/1968 | Kurz.............................. | 287/124 X |
| 3,475,795 | 11/1969 | Youngblood.................... | 24/122.6 |

FOREIGN PATENTS

| 346,846 | 7/1960 | Switzerland................. | 287/124 |
|---|---|---|---|

Primary Examiner—Kenneth Downey
Assistant Examiner—Andrew V. Kundrat
Attorney—McNenny, Farrington, Pearne & Gordon ABSTRACT: An end fitting and method for tensioning a plastic rod having longitudinal reinforcing fibers; an end portion of the rod being split, and the split end portions being separated by a wedge to form a first subassembly; slightly separated halves of a frustoconical split ferrule being applied to embrace the first subassembly from opposite sides thereof to form a second subassembly; the second subassembly being forcibly seated in a frustoconical bore of an outer fitting body adapted to be connected to a tension load; and a plug being threaded into said body to engage the parts of the second subassembly adjacent the large end of the bore of said body for driving them together into mutually wedged relationship in said body and developing high frictional pressures between mating tapered surfaces of the parts of the final assembly and for holding those parts against reverse movement.

PATENTED AUG 17 1971
3,600,014
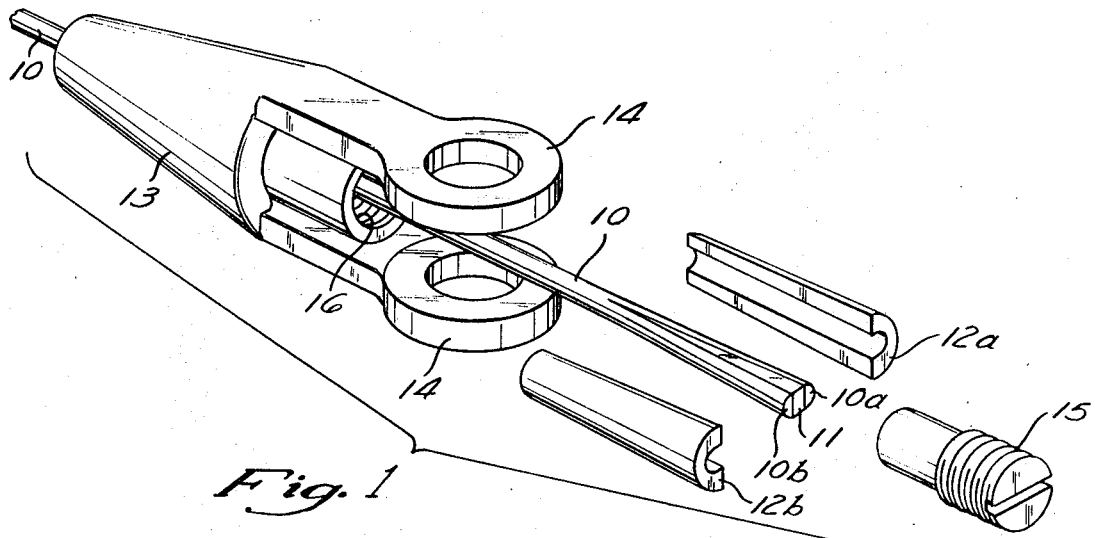
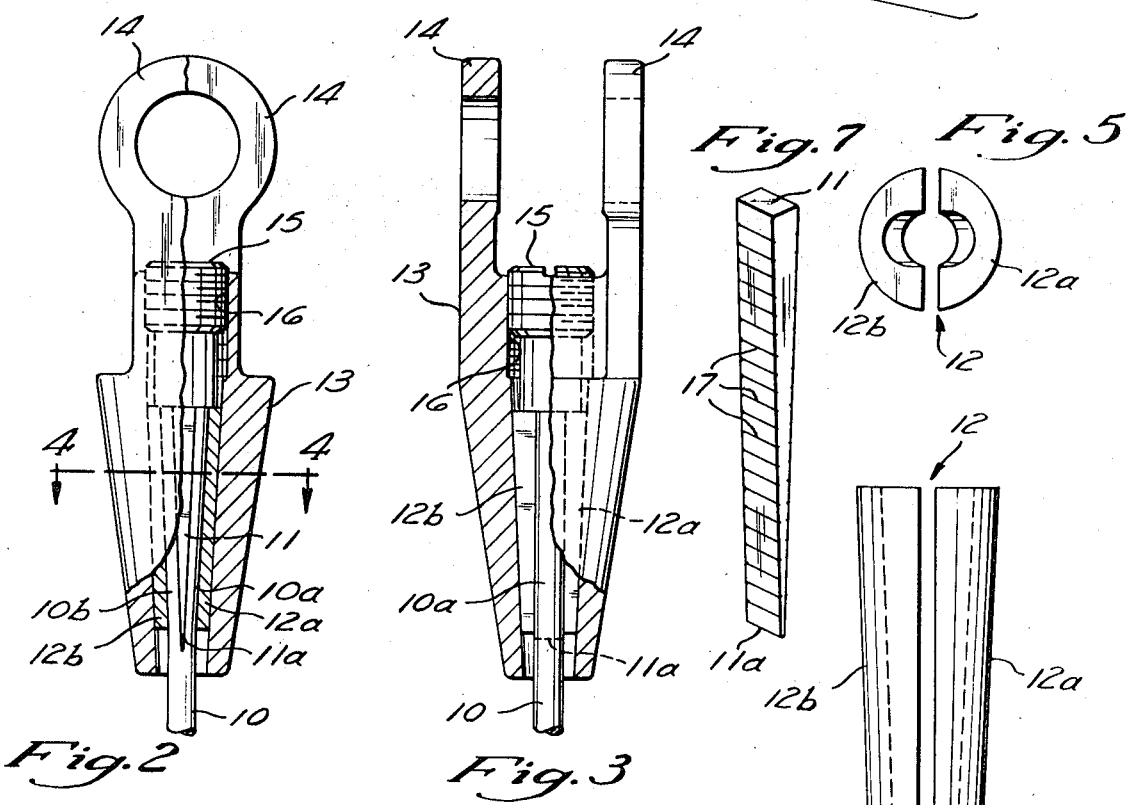
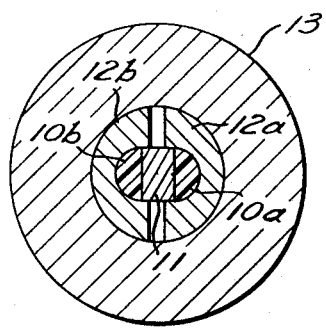
INVENTOR.
THOMAS HARRIS
BY
MCNENNY, FARRINGTON, PEARNE & GORDON
ATTORNEYS

MECHANICAL END FITTINGS FOR TENSION RODS

BACKGROUND OF THE INVENTION

In recent years, increasing use has been made of fiber-reinforced, molded plastic rods as tension members in a variety of environments because of their high strength-to-weight ratio, resistance to corrosion and deterioration with age, favorable manufacturing cost, and, in many instances, other desirable mechanical properties, such as resistance to fatigue failures. However, the use of such tension rods has been limited by the difficulty of providing satisfactory end fittings for connecting tension loads to the rods.

Forming threads on the external end surfaces of fiber-reinforced plastic rods to secure end fittings thereon is undesirable because cutting the threads also cuts through many of the fibers constituting the principal stress-resisting components of the rods. This not only reduces the effective diameter of the rods for resisting tensile loads, but the cut threads are notoriously weak in shear and tend to fail under loads far below those that the rods themselves are capable of resisting.

Complete or partial reliance upon the cementing of end fittings to molded plastic rods, as a substitute for the use of threaded connections, has also proven unsatisfactory, particularly, where the end fittings must be applied to the rods after they have been cut to appropriate lengths in the field for the installations in which they are to be used. Not only are adhesive bonds weak and unreliable in resisting shear forces, particularly variable forces that produce nonuniform stress differentials or "working" in the joint, but they are also difficult and time consuming to produce in the field. Moreover, in many situations, cemented joints have the disadvantage that the fittings cannot be readily removed and reapplied or reused.

In efforts to overcome the foregoing problems, the ends of tension rods have been pierced and spread by inserting conical wedges to form frustoconical end portions that are seated in correspondingly tapered end fitting sockets to provide positive resistance to withdrawal of the rods from the fittings. Generally, however, cement bonds were still required to secure the wedges and rod ends against relative movement under load, particularly under variable loads. In some cases, the wedges in such fitting assemblies have been formed in place from a settable cement or plastic. However, all of these joint structures using a settable cement or the like are difficult to assemble in the field and have the serious disadvantage that they require time for the joint to set before it can be used. Again, such joints are difficult to disassemble when the need arises.

SUMMARY OF THE INVENTION

The objects of the present invention are to overcome the foregoing problems by providing mechanical end fittings for tension rods that require no cutting of threads or other reduction of the effective cross-sectional areas of the rods, that require no adhesive bonds, that are easily and quickly applied in the field as well as in factories, that will be equally effective under both uniform and nonuniform loading conditions, that may be readily disassembled and reapplied or reused, and that will reliably resist tension loads up to the capacity of the tension rods themselves.

In accordance with the invention, these objects are accomplished by splitting the end of a rod on a diameter or medial plane for nearly the distance over which the rod end is to be enclosed and gripped by the end fitting; inserting the rod end (before or after splitting it) through a central bore of an outer fitting body to which a tension load is to be connected; separating the split end portions of the rod substantially over the length of those portions by means of an elongated wedge to provide a flared rod end portion incorporating the wedge; largely enclosing such flared rod end portion by the halves of a longitudinally split, tapered ferrule having a tapered bore generally conforming to the flared rod end when the ferrule halves are slightly separated; and forcibly seating the assembly of the split ferrule, split rod end, and wedge in a correspondingly tapered bore of the outer body of the fitting.

Forcible seating of such an inner assembly in the outer body of the fitting is preferably effected by means of a threaded plug or the like that is adjustably and removably driven into one end of the bore of the outer fitting body and against the exposed end of the inner assembly to build up initial gripping pressures between the several mating, tapered surfaces of the entire assembly for frictionally resisting a tension load applied to the outer fitting body. The plug or the like also prevents reverse relative movement of the assembled parts upon relaxation or reversal of the tension load.

The design of the parts of the end fitting assembly is such as to develop and transmit high frictional pressures from the tapered inner surfaces of the split ferrule and tapered external surfaces of the wedge against opposite sides of each half of the split rod end, thereby preventing the rod from being pulled out of the small end of the tapered bore of the outer fitting body and maintaining the integrity and stability of the flared rod end and wedge assembly. Since the longitudinal splitting of the rod end may be readily accomplished without severing the reinforcing fibers of the rod, those fibers are simply separated into two bundles that diverge toward the rod end without any large, abrupt change in direction. Thus, the tension load resistance of the fibers is not significantly impaired.

The design of the parts of the end fitting assembly is also such that each half of the split rod end is enclosed and subjected to the aforesaid high frictional pressures completely around its periphery so as to minimize any tendency of those pressures to crush and fracture the plastic matrix in which the rod fibers are embedded. Thus, the integrity of the plastic matrix enclosing the fibers is actually enhanced by the mating surface pressures created in the assembly. The result is a joint between the rod end and the end fitting which is as strong, or stronger under tension loading than the rod itself.

Although the end fittings of the invention are particularly designed for and achieve all of their several advantages to the optimum extent when the fittings of invention are applied to fiber-reinforced, molded plastic rods of circular cross section, the invention is applicable to rods of other cross-sectional configurations, and its utility is not limited to its use with fiber-reinforced rods or even to molded plastic rods. This will be more evident from the ensuing detailed description of the invention.

BRIEF DESCRIPTION OF THE DRAWINGS

In the drawing:

FIG. 1 is a partially exploded view of the parts of a rod and end fitting assembly in accordance with the invention;

FIG. 2 is a view, partly in section, of the end fitting of FIG. 1 assembled and secured to the longitudinally split end portions of the fiber-reinforced, molded plastic rod;

FIG. 3 is a similar view of the end fitting and rod taken at right angles to the view of FIG. 2;

FIG. 4 is a transverse sectional view taken as indicated by the line 4—4 in FIG. 2;

FIG. 5 is an enlarged scale end view of the halves of the split ferrule of the end fitting, the halves being slightly separated approximately as shown in FIG. 4;

FIG. 6 is a similarly enlarged side view of the slightly separated halves of the split ferrule; and FIG. 7 is a similarly enlarged perspective view of the wedge of the end fitting.

DETAILED DESCRIPTION OF THE INVENTION

Referring to the drawing, a round, fiber-reinforced, molded plastic rod 10 is split longitudinally along a diameter thereof to provide rod end portions 10a and 10b of substantially identical, semicircular cross sections. The rod end portions 10a and 10b are spread apart to receive a wedge 11 therebetween. The wedge 11 preferably tapers to substantially a knife edge at its thin end 11a and, thus, may be substantially coextensive with the rod end portions 10a and 10b separated thereby.

This first subassembly (shown assembled in FIG. 1) provides a flared rod end portion, including the wedge 11, that flares continuously in width as shown in FIGS. 1 and 2, but is of uniform width equal to the diameter of the rod 10 as viewed in FIG. 3. This flaring rod end portion has a typical cross section defined by two straight parallel lines having their corresponding ends joined by 180° circular arcs, as clearly shown in FIG. 4. This cross section varies along the lengths of the flared rod end, approaching a circle where the flared portions are joined and merge into the unsplit body of the rod.

For want of an established geometrical term for the varying cross-sectional configuration of the first subassembly of the rod ends 10a and 10b and wedge 11, the use of the coined term will be helpful. It will be noted that this cross section comprises the varying rectangular cross section of the wedge 11 plus the two semicircular cross sections of the rod end portions 10a and 10b, the whole resembling the shape of a track and commonly misnamed an "oval." Such a configuration will be referred to herein, for convenience, by the coined term "rectoval."

That first subassembly is then partially enclosed by the slightly separated halves 12a and 12b of a longitudinally split, frustoconical ferrule, generally designated 12, to form a second subassembly. While disposed together (not shown), the ferrule halves 12a and 12b define a longitudinal bore that tapers in the same direction as the external surface of the split ferrule. The small end of this bore is nearly circular, being defined by two circular arcs of slightly less than 180° each and having substantially the radius of the rod 10. The large end of this bore is a rectoval (as defined above), defined by two 180° circular arcs of substantially the radius of the rod 10 plus a rectangular midportion therebetween. The split ferrule 12 is preferably slightly shorter than the wedge 11.

By embracing the first subassembly with the slightly separated halves of the split ferrule 12, the relationship of the parts of the first subassembly is maintained as shown in FIG. 4. The split ferrule halves conform interiorly to the rectoval cross-sectional configuration of the first subassembly with a close sliding fit, but the exterior configuration of the second subassembly is substantially circular, except for the gaps on opposite sides thereof between the split ferrule halves.

The second subassembly of the wedge 11, flared rod ends 10a and 10b, and split ferrule 12, with the parts in the relationship shown in FIGS. 2, 3, and 4, are seated in a frustoconical bore of an outer fitting body 13. Ideally, as shown in FIGS. 2—4 of the drawing, the parts are so proportioned relative to one another that the maximum diameter of the split ferrule in the assembly is the same as or only slightly larger than the maximum diameter of the frustoconical bore of the fitting body 13 so that the mating surfaces of the split ferrule and fitting body precisely conform to one another about the periphery of the split ferrule halves. However, precise conformance in this regard is not essential.

The fitting body 13 may have any desired external configuration, but may suitably be shaped as shown in the drawing to provide spaced ears 14 for receiving the pin of a ring and pin connection to a tension load (not shown). The minimum diameter of the bore of the fitting body 13 must, of course, be less than the maximum diameter of the split ferrule in the assembly and is preferably substantially less than the minimum width of the large end of the split ferrule when its halves are contiguous.

The several tapered parts 10a, 10b, 11, and 12 of the second subassembly are together moved to and forcibly held in their seated relationship in the fitting body 13 by means of a threaded plug 15 that may be slotted at one end to be driven home with a screwdriver. The large end of the frustoconical bore of the fitting body ends in a threaded cylindrical bore 16 to receive the plug 15. Preferably, the plug 15 engages the ends of all of the of the second subassembly, holding them forcibly in engagement with one another and with the surface of the conical bore of the fitting body 13 so as to develop substantial pressure of each tapered surface against its mating tapered surface. As a result of such forcible seating of the parts, frictional resistance to pulling the rod out of the fitting is developed not only over the outer peripheral surfaces of the split rod end portions by pressure of the split ferrule halves thereon, but also over the inner split surfaces of the rod end portions by pressure between them and the wedge. The application of a tension load pulls all of the components of the second subassembly into more tightly wedged relationship in the tapered bore of the outer fitting body and thereby increases the friction-creating pressures as the tension load increases, and at a rate such that the rod 10 will normally break before the split rod end portions can even begin to slip relative to the wedge and/or split ferrule.

The wedge 11, split ferrule 12, outer fitting body 13, and plug 15 are preferably made of metal, suitably aluminum from which the wedge and split ferrule may be easily and inexpensively formed by diecasting. When forming the latter parts in this manner, the opposite diverging surfaces of the wedge 11, for example, may be formed with a multiplicity of small, shallow, surface indentations, ribs, or the like as shown at 17 (FIG. 7) to provide, in effect, rough surfaces that engage the split rod end portions 10a and 10b. Such surface conformations are effective to increase the resistance to slippage of the split rod ends relative to the parts engaged thereby without cutting or biting into the split rod ends sufficiently to sever or damage reinforcing fibers contained therein. The interior surfaces of the split ferrule halves 12a and 12b may be provided s with similar conformations (not shown).

Although the present invention has been described above and shown in the drawings as applied to a round tension rod, it will be evident from a consideration of FIG. 4 of the drawing that the invention is applicable to rods having other cross-sectional shapes by modifying only the cross-sectional configuration of the bore of the split ferrule 12 to conform the split ferrule halves to the split end portions of rods of other cross-sectional shapes.

Although the threaded plug 15 is easily applied so as to gradually and controllably force the parts of the second subassembly together into their seated relationship during final assembly thereof in the fitting body 13 and thereafter prevents any reverse movement of the parts upon relaxation or reversal of an applied tension load, the seating function may be easily and quickly performed by forcing any suitable ram or the like into the bore of the outer fitting body and against the parts of the second subassembly. Once a tension load has been applied to the completed assembly, the presence of the plug 15 may only be needed or desired when installation conditions may involve a relaxation or reversal of the tension load. Moreover, although the plug 15 is desirably removable as shown and described, closure of the open end of the bore of the fitting body may be effected by any desired form of closure means.

Similarly, other specific details of the preferred form of the invention as described and shown herein are merely illustrative and may be modified in various ways within the scope of the invention as defined in the appended claims.

What I claim is:

1. An end fitting assembly for application to a tension rod, comprising an elongated wedge for spreading the end of a solid rod that is split longitudinally and transversely therethrough to produce spaced rod end portions and substantially fill the space therebetween and form a solid flared rod end portion that includes the wedge; an elongated, split ferrule, the halves of the split ferrule being outwardly of generally frustoconical form when slightly separated and contiguous halves thereof defining a longitudinal bore that tapers in the same direction for embracing and generally conforming to opposite sides of said flared rod end portion when the ferrule halves are slightly separated; and an exterior housing adapted to be connected to a load for placing the rod in tension, said housing having a frustoconical bore generally conforming to the exterior of the split ferrule halves for receiving the same while slightly separated along their parting plane, the minimum transverse dimension of said frustoconical bore being less than the corresponding dimension of the large end of the split ferrule; whereby the split ferrule, with the halves so separated, may be coaxially wedge in said bore of said housing with said flared rod end portion coaxially embraced by and wedged between the separated halves of the split ferrule.

2. An end fitting according to claim 1 in which converging surfaces of the wedge are substantially planar and of uniform widths, opposite longitudinal edges of each of said surfaces being embraceable with a close sliding fit by one of the split ferrule halves when said halves are slightly separated along their parting plane.

3. An end fitting according to claim 1 including removable means secured in said housing adjacent the large end of said frustoconical bore for forcibly engaging and positioning the wedge, the split ferrule halves, and the split rod end portions in wedged relationship therein.

4. An end fitting for a tension rod, comprising an elongated wedge for spreading a longitudinally split end of a rod to form a flared rod end portion that includes the wedge; an elongated split ferrule having a longitudinally bore defined by contiguous opposite halves thereof, said bore being of uniform width measured in the parting plane of the ferrule and tapering in width measured in a median plane of the ferrule normal to said parting plane, the halves of the split ferrule being outwardly frustoconical; when slightly separated and an exterior housing adapted to be connected to a load for placing the rod in tension, said housing having a frustoconical bore generally conforming to the exterior of the split ferrule and a minimum transverse dimension at its small end that is less than the corresponding dimension of the exterior of contiguous halves of the split ferrule; the split ferrule, with its halves slightly separated along their parting plane, being adapted to be coaxially wedged in said bore of said housing with said flared rod end coaxially embraced by and wedged between the halves of the split ferrule.

5. An end fitting according to claim 4 in which said bore of said housing terminates adjacent the large diameter end thereof with removable means for closing that end thereof against outward movement of said split ferrule and flared rod end portion.

6. An end fitting according to claim 4 in which said bore of said housing terminates at the large diameter end thereof with removable means for closing that end thereof against outward movement of said split ferrule and flared rod end portion; said means being operative to force said wedge, split rod end, and split ferrule into their wedged relationships with one another and with said housing.

7. A tension rod and end fitting assembly, comprising a rod longitudinally split from one end thereof; an elongated wedge separating the split end portions of the rod to form a flared rod end portion that includes the wedge; an elongated, split ferrule, the halves of the split ferrule being outwardly of generally frustoconical form and defining a longitudinal bore of rectoval cross section that tapers in the same direction when said halves are slightly separated, the halves of said ferrule embracing and being slightly separated by said flared rod end portion; and an exterior housing adapted to be connected to a load for placing the rod in tension, said housing having a frustoconical bore generally conforming to the exterior of the split ferrule and receiving the same with the halves thereof slightly separated along their parting plane; the split ferrule, with its halves so separated, being coaxially wedged in said bore of said housing with said flared rod end portion coaxially embraced by and wedged between the halves of the split ferrule.

8. An assembly according to claim 7, including means removably mounted on said fitting body for forcibly moving said split ferrule and flared rod end portion into said wedged relationships with each other and with said fitting body.

9. A tension rod and end fitting assembly, comprising a rod longitudinally split from one end thereof; an elongated wedge separating the split end portions of the rod to form a flared rod end portion that includes the wedge; an elongated split ferrule having a longitudinal bore defined by contiguous halves thereof, said bore tapering in width as measured in a median plane normal to the parting plane of the ferrule and being of uniform width measured in the parting plane of the ferrule, said halves of the split ferrule being outwardly of generally frustoconical form when slightly separated, and the halves of aid ferrule embracing and being slightly separated along their parting plane by said flared rod end portion to form a subassembly; and an exterior housing adapted to be connected to a load for placing the rod in tension, said housing having a frustoconical bore generally conforming to the exterior of the split ferrule with the halves thereof separated, and said bore having a minimum transverse dimension at the small end thereof that is less than the minimum transverse dimension of said subassembly and receiving said subassembly with the parts thereof forcibly held in engagement by being wedged therein.